United States Patent Office 3,711,445
Patented Jan. 16, 1973

---

3,711,445
SELF-PRIMING POLYURETHANE COMPOSITIONS
Edward Chu, Philadelphia, and Lee R. Harper, Media, Pa., assignors to E. I. du Pont de Nemours and Company, Wilmington, Del.
No Drawing. Filed Oct. 8, 1970, Ser. No. 79,253
Int. Cl. C08g 22/00
U.S. Cl. 260—77.5 AM                    17 Claims

ABSTRACT OF THE DISCLOSURE

Self-priming polyurethane sealants and a process for preparing them by incorporating a functional amine alkoxysilane into the prepolymerization of the isocyanate backbone of the polymeric composition.

SUMMARY OF THE INVENTION

This invention relates to a polyurethane sealant composition and a process of preparing it from an isocyanate, a polyol and a functional amine alkoxysilane. The use of this functional amine alkoxysilane is such that it is incorporated into the initial prepolymerization of the polyurethane. This enables the polyurethane thus formed to exhibit some priming properties. This self-priming property contributes to the adhesive quality of the polyurethane sealant such that no other primer is required for the application of the polyurethane sealant.

DESCRIPTION OF THE INVENTION

The present invention relates to a method of imparting improved adhesive qualities to elastomeric polyurethane sealant compositions. This adhesive result is accomplished by an improved method of elastomeric formulation whereby a functional amine alkoxysilane additive is incorporated into the prepolymerization of the polyurethane. This functional amine alkoxysilane additive is added to the unpolymerized composition of the isocyanate and the polyol which will react to form a polyurethane. By adding the functional amine alkoxysilane at this time, uniform distribution of the alkoxysilane is achieved in the polymeric backbone of the polyurethane composition. The end product is thereby a polyurethane containing pendent trialkoxysilane groups of the formula

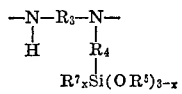

wherein $R_3$ is alkylene having between 2 and 6 carbon atoms, $R_4$ is alkylene having between 1 and 6 carbonations, and $R^7$ is methyl or phenyl and $x$ is 0 or 1.

The amount of functional amine alkoxysilane used is important since too much will ruin the polyurethane backbone by imparting too little cohesion to the polymer although maintaining a good adhesive property. The cohesive attraction must be balanced with the adhesion sought. Suitable amounts of functional amine alkoxysilane are about 0.1–0.6% by weight of the total urethane formulation, with about 0.2–0.4% by weight being preferred and about 0.3% being especially preferred. Suitable functional amine alkoxysilanes for use in this invention are difunctional amine alkoxysilanes such as N-beta(aminoethyl)-gamma-aminopropyltrimethoxysilane
N-beta(aminopropyl)-gamma-aminopropyltrimethoxysilane
N-(dimethoxymethyl silylisobutyl)ethylene diamine and monofunctional amine alkoxysilanes such as Gamma (aminopropyl)triethoxysilane and
Gamma (aminopropyl)trimethoxysilane The diisocyanates used in this invention are the same well-known diisocyanates used in all polyurethane sealant compositions. Illustrative of such diisocyanates are those having the general structure

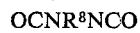

and $R^8$ is either an alkylene radical having 2–12 carbon atoms,

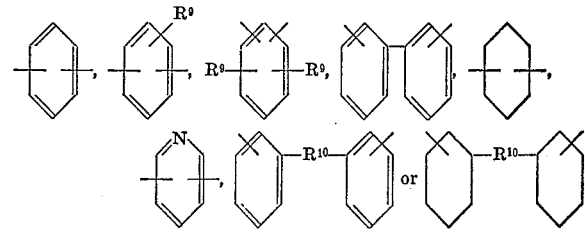

wherein $R^{10}$ is either an alkylene radical containing 1–4 carbon atoms,

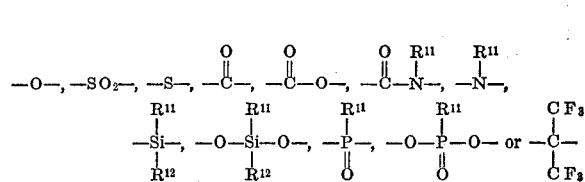

and $R^9$ is an alkyl radical of 1–3 carbon atoms and $R^{11}$ and $R^{12}$ are individually selected from the group consisting of an alkyl radical having 1–3 carbon atoms and an aryl radical.

The following are organic diisocyanates useful in this invention:

propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate,
2,11-diisocyanato-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanates, such as methylpropylbenzene diisocyanate, methylethylbenzene diisocyanate, and the like;
2,2'-biphenylene diisocyanate,
3,3'-biphenylene diisocyanate,
4,4'-biphenylene diisocyanate,
3,3'-dimethyl-4,4'-biphenylene diisocyanate, and the like;
methylene-bis-(4-phenyl isocyanate),
ethylene-bis-(4-phenyl isocyanate),
isopropylidene-bis-(4-phenyl isocyanate),
butylene-bis-(4-phenylisocyanate),
hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate, and the like;
2,2'-ketodiphenyl diisocyanate, (3-isocyanato-methyl-3,5,5-trimethylenecyclohexyl-
isocyanate)

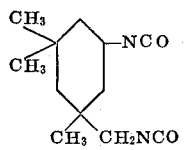

3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like;
2,2'-sulfonediphenyl diisocyanate,
3,3'-sulfonediphenyl diisocyanate,
4,4'-sulfonediphenyl diisocyanate, and the like;
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate,
4,4'-propylene-bis-(cyclohexyl isocyanate),
bis-(para-isocyanato-cyclohexyl)sulfide,
bis-(para-isocyanato-cyclohexyl)sulfone,
bis-(para-isocyanato-cyclohexyl)ether,
bis-(para-isocyanato-cyclohexyl)diethyl silane,
bis-(para-isocyanato-cyclohexyl)diphenyl silane,
bis-(para-isocyanato-cyclohexyl)ethyl phosphine oxide,
bis-(para-isocyanato-cyclohexyl)phenyl phosphine oxide,
bis-(para-isocyanato-cyclohexyl)N-phenyl amine,
bis-(para-isocyanato-cyclohexyl)N-methyl amine,
2,6-diisocyanato-pyridine,
bis-(4-isocyanato-phenyl)diethyl silane,
bis-(4-isocyanato-phenyl)diphenyl silane,
dichloro-biphenylene diisocyanate,
bis-(4-isocyanato-phenyl)ethyl phosphine oxide,
bis-(4-isocyanato-phenyl)phenyl phosphine oxide,
bis(4-isocyanato-phenyl)-N-phenyl amine,
bis-(4-isocyanato-phenyl)-N-methyl amine,
3,3'-dimethyl-4,4'-diisocyanato biphenyl,
3,3'-dimethoxy-biphenylene diisocyanate,
2,4-bis-($\beta$-isocyanato-t-butyl)toluene,
bis(para-$\beta$-isocyanato-t-butyl-phenyl)ether
para-bis(2-methyl-4-isocyanato-phenyl)benzene,
para-bis-(1,1-dimethyl-5-amino-pentyl)benzene,
3,3'-diisocyanato adamantane,
3,3'-diisocyanato biadamantane,
3,3'-diisocyanatoethyl-1,1'-biadamantane,
1,2-bis-(3-isocyanato-propoxy)ethane,
2,2-dimethyl propylene diisocyanate,
3-methoxy-hexamethylene diisocyanate,
2,5-dimethyl heptamethylene diisocyanate,
5-methyl-nonamethylene diisocyanate,
1,4-diisocyanato-cyclohexane,
1,2-diisocyanato-octadecane,
2,5-diisocyanato-1,3,4-oxadiazole,
$OCN(CH_2)_3O(CH_2)_2O(CH_2)_3NCO$,
$OCN(CH_2)_3S(CH_2)_3NCO$ and
$OCN(CH_2)_3N(CH_2)_3NCO$

PREPARATION OF THE POLYURETHANE COMPOSITION

Polyurethanes of this invention are prepared by reacting the isocyanate, polyol, and the alkoxysilane.

UTILITY

This invention has the obvious advantage of producing a polyurethane sealant composition which requires no prior substrate priming before it is applied to that substrate. This has the advantage of reducing the cost (since a step and another formulation is eliminated), by saving time, and by eliminating the problem of improper priming or less than 100% priming of the surface which would create an improper seal. It has also been discovered that polyurethane compositions prepared according to this invention have improved adhesive properties beyond that of normal polyurethanes applied over prime surfaces. This is especially true when the substrate to which the polyurethane sealant is applied is a glass or anodized aluminum substrate, especially after water immersion of the substrate coated with said polyurethane composition. This property is unique to this art as water immersion is generally one of the most severe tests to which a polyurethane sealant can be subjected.

DESCRIPTION OF THE PREFERRED EMBODIMENTS

The following examples illustrate the various aspects of the invention in greater detail. However, it should be recognized that they are only illustrative. Variations from what is disclosed will undoubtedlly occur to those skilled in the art, but will nevertheless be embraced by the inventive concept. All parts are by weight.

EXAMPLE 1

A polyurethane sealant was prepared by (1) Mixing (a) 482.0 grams of a sand ground pigment dispersion containing 53.8 parts polypropylene ether diol (mol. wt. about 3,000), 36.0 parts $CaCO_3$ and 18.2 parts $TiO_2$, (b) 63.7 grams of polypropylene ether triol (mol. wt. about 4,000) and (c) 138.0 grams petroleum naphtha in a resin kettle equipped with a stirrer, distillation head, and covered by an inert gas atmosphere.

(2) The mixture of (1) was heated so as to distill off 50.0 grams petroleum naphtha and allowed to cool to 70° C.

(3) 2.3 ml. of N-beta-(aminoethyl)-gamma-amino-propyltrimethoxysilane was added to the resultant mixture of (2) followed by an addition of 45.9 grams of methylene bis(2-phenylisocyanate) and 1 drop of stannous octoate catalyst and the resultant mixture stirred for 10 minutes.

(4) After the mixture of (3) was heated to 100–105° C. for 1 hour and cooled to room temperature, 67.0 grams of a naphthenic and paraffinic process oil blend was added followed by 37.5 grams fumed silica and 1 hour of stirring.

(5) The resultant mixture was a polyurethane sealant having a viscosity of 20 seconds in a Stormer Viscometer. This polyurethane was applied to glass and aluminum substrates and had good adhesive properties.

EXAMPLE 2

A polyurethane sealant was prepared by (1) Mixing (a) 482.0 grams of a sand ground pigment dispersion containing 53.8 parts polypropylene ether triol, 36.0 parts $CaCO_3$ and 18.2 parts $TiO_2$, (b) 63.7 parts of polypropylene ether triol and (c) 138.0 grams petroleum naphtha in a resin kettle equipped with a stirrer, distillation head, and covered by an inert gas atmosphere.

(2) The mixture of (1) was heated so as to distill off 50.0 grams petroleum naphtha and allowed to cool to 70° C.

(3) 2.3 ml. of N-dimethoxymethyl silylisobutylethylene diamine were added to the resultant mixture of (2) followed by an addition of 40.8 grams of isophorone diisocyanate and 3 drops of stannous octoate catalyst and the resultant mixture stirred for 10 minutes.

(4) After the mixture of (3) was heated to 100–110° C. for 4 hours and cooled to room temperature, 67.0 grams of a naphthenic and paraffinic process oil blend was added followed by 37.5 grams of fumed silica and 1 hour of stirring.

(5) 0.5 ml. of bis(2-dimethylaminoethyl)ether and 0.5 ml. of dibutyl tin dilaurate were added to the mixture of (4), mixed for 1 hour and deaerated.

A polyurethane resulted having good adhesion to glass and aluminum and good light stability resulted.

EXAMPLE 3

A polyurethane sealant was prepared by (1) Mixing 153.0 grams of polypropylene ether diol, 77.3 grams of polypropylene ether triol, 135.6 grams of $CaCO_3$, 24.5 grams of carbon black, and 80.0 grams of petroleum naphtha.

(2) A mixture of (1) was heated so as to distill off 30.0 grams of petroleum naphtha and allowed to cool to 85° C.

(3) 2.0 ml. of N-beta-(aminoethyl)-gamma-aminopropyltrimethoxysilane was added to the resultant mixture of (2) followed by an addition of 26.5 grams of 2,4-toluene diisocyanate and 2,6-toluene diisocyanate and 1 drop of stannous octoate catalyst and the resultant mixture was stirred for 10 minutes.

(4) After the mixture of (3) was heated to 100° C. for 2 hours and cooled to 30° C., 22.0 grams of fumed silica was added followed by 1 hour of stirring.

(5) To the mixture of (4) was added 1.0 ml. of bis(2-dimethylaminoethyl)ether followed by 30 minutes of stirring and deaeration under a vacuum.

An overnight cure of the above prepared polyurethane produced a sealant having good adhesion to glass and metal.

EXAMPLE 4

A polyurethane sealant was prepared by (1) Mixing (a) 482.0 grams of a sand ground pigment dispersion containing 53.8 parts polypropylene ether diol (mol. wt. about 3,000), 36.0 parts $CaCO_3$ and 18.2 parts $TiO_2$, (b) 63.7 grams of polypropylene ether triol (mol. wt. about 4,000) and (c) 138.0 grams petroleum naphtha in a resin kettle equipped with a stirrer, distillation head, and covered by an inert gas atmosphere.

(2) The mixture of (1) was heated so as to distill off 50.0 grams petroleum naptha and allowed to cool to 70° C.

(3) 2.5 ml. of gamma-aminopropyltriethoxy silane were reacted with 5.3 grams of methylene bis (4-phenylisocyanate) and 0.02 gram of stannous octoate catalyst at 100° C. for 1 hour under anhydrous conditions. This reaction product was then mixed with 40.6 grams of methylene bis(4-phenylisocyanate) and added to the resultant mixture of step (2) using 1 drop of stannous octoate catalyst. The reaction mixture was stirred for 10 minutes.

(4) After the mixture of (3) was heated to 100–105° C. for 1 hour and cooled to room temperature, 67.0 grams of a naphthenic and paraffinic process oil blend was added followed by 37.5 grams fumed silica and 1 hour of stirring.

(5) The resultant mixture was a polyurethane sealant having a viscosity of 20 seconds in a Stormer Viscometer. This polyurethane was applied to glass and aluminum substrates and had good adhesive properties.

The invention claimed is:

1. A polyurethane polymer liquid at room temperature, derived from polymerization of reactants comprising diisocyanate, polyol and amine alkoxysilane, said polyurethane polymer containing between 0.1 and 0.6% by weight of amine alkoxysilane units of the formula $$-\underset{H}{\overset{}{N}}-R_3-\underset{R_4}{\overset{}{N}}-$$
$$R_x{}^7Si(OR^5)_{3-x}$$

wherein $R_3$ is alkylene having between 2 and 6 carbon atoms, $R_4$ is alkylene having between 1 and 6 carbon atoms, and $R^7$ is methyl or phenyl and $x$ is 0 to 1.

2. The polyurethane of claim 1, wherein the diisocyanate has the general structure $$OCNR^8NCO$$

and $R^8$ is either an alkylene radical having 2–12 carbon atoms,

[structures shown]

wherein $R^{10}$ is either an alkylene radical containing 1–4 carbon atoms, $$-O-, -SO_2-, -S-, -\overset{O}{\underset{}{C}}-, -\overset{O}{\underset{}{C}}-O-, -\overset{O}{\underset{}{C}}-\underset{R^{11}}{\overset{}{N}}-, -\underset{R^{11}}{\overset{R^{11}}{N}}-$$

$$-\underset{R^{12}}{\overset{R^{11}}{Si}}-, -O-\underset{R^{12}}{\overset{R^{11}}{Si}}-O-, -\underset{O}{\overset{R^{11}}{P}}-, -O-\underset{O}{\overset{R^{11}}{P}}-O- \text{ or } -\underset{CF_3}{\overset{CF_3}{C}}-$$

and $R^9$ is an alkyl radical of 1–3 carbon atoms and $R^{11}$ and $R^{12}$ are individually selected from the group consisting of an alkyl radical having 1–3 carbon atoms and an aryl radical.

3. A sealant composition consisting essentially of the polyurethane of claim 2.

4. The polyurethane of claim 1, wherein the amine alkoxysilane comprises 0.2–0.4% by weight of the polyurethane.

5. A sealant composition consisting essentially of the polyurethane of claim 4.

6. The polyurethane of claim 4, wherein the polyol is at least one member of the group consisting of ethylene ether diol, propylene ether diol, tetramethylene ether diol and caprolactone having between 10 and 150 repeating ether groups and the diisocyanate is at least one member of the group consisting of isophonone diisocyanate, 2,6-toluene diisocyanate and methylene bis-(4-phenyl diisocyanate).

7. The polyurethane of claim 6 comprising cross-linking sites derived from triol reactant.

8. The sealant composition consisting essentially of the polyurethane of claim 1.

9. A polyurethane polymer liquid at room temperature, derived from polymerization of reactants comprising diisocyanate, polyol and amine alkoxysilane, said polyurethane polymer containing between 0.1 and 0.6% by weight of amine alkoxysilane units wherein said amine alkoxysilane reactant is at least one member of the group consisting of N-beta-(aminoethyl)-gamma-aminopropyltrimethoxysilane, N-beta-(aminopropyl) - gamma-aminopropyltrimethoxysilane, N-(dimethoxymethysilylisobutyl) ethylene diamine.

10. A sealant composition consisting essentially of the polyurethane of claim 9.

11. The composition of claim 9 comprising cross-linking sites derived from triol reactant.

12. The polyurethane polymer of claim 9, wherein the diisocyanate has the general structure $$OCNR^8NCO$$

and $R^8$ is either an alkylene radical having 2–12 carbon atoms,

[structures shown]

wherein $R^{10}$ is either an alkylene radical containing 1–14 carbon atoms,

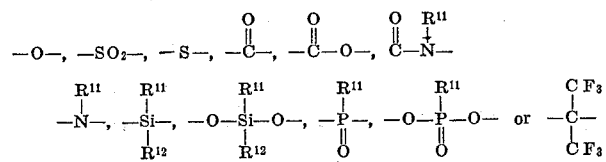

and $R^9$ is an alkyl radical of 1–3 carbon atoms and $R^{11}$ and $R^{12}$ are individually selected from the group consisting of an alkyl radical having 1–3 carbon atoms and an aryl radical.

13. A sealant composition consisting essentially of the polyurethane of claim 12.

14. The polyurethane of claim 9, wherein the amine alkoxysilane comprises 0.2–0.4% by weight of the polyurethane.

15. A sealant composition consisting essentially of the polyurethane of claim 14.

16. The polyurethane of claim 14 wherein the polyol is at least one member of the group consisting of ethylene ether diol, propylene ether diol, tetramethylene ether diol and caprolactone having between 10 and 150 repeating ether groups and the diisocyanate is at least one member of the group consisting of isophonone diisocyanate, 2,6-toluene diisocyanate and methylene bis-(4-phenyl diisocyanate).

17. The polyurethane of claim 16 comprising cross-linking sites derived from triol reactant.

References Cited

UNITED STATES PATENTS 3,455,855  7/1969  Houghton et al. __ 260—77.5 AM
3,309,201  3/1967  Schiller et al. ____ 260—824 R DONALD E. CZAJA, Primary Examiner M. J. WELSH, Assistant Examiner U.S. Cl. X.R.

117—124 E, 132 B; 260—33.6 UB, 37 N, 482 B, 482 C